United States Patent
Egbert et al.

(10) Patent No.: US 6,735,705 B1
(45) Date of Patent: May 11, 2004

(54) POWER CONTROL CIRCUITS WITH ENHANCED NONLINEAR CURRENT SENSING

(76) Inventors: Thomas E. Egbert, 7719 Hermosa St., Ventura, CA (US) 93004; Mark Stein, 4633 Vista Buena Rd., Santa Barbara, CA (US) 93110; Robert B. Lyon, 4633 Vista Buena Rd., Santa Barbara, CA (US) 93110; Cyril L. Johnson, 5047 Santa Susana Ave., Santa Barbara, CA (US) 93111

(*) Notice: Subject to any disclaimer, the term of this patent is extended or adjusted under 35 U.S.C. 154(b) by 670 days.

(21) Appl. No.: 09/699,891

(22) Filed: Oct. 30, 2000

(51) Int. Cl.[7] ............................................... G06F 1/26
(52) U.S. Cl. ........................ 713/300; 713/300; 713/320
(58) Field of Search .................................. 713/300, 320

(56) References Cited

U.S. PATENT DOCUMENTS

| | | | | |
|---|---|---|---|---|
| 3,651,393 A | * | 3/1972 | Pohm ........................... | 363/67 |
| 4,565,958 A | * | 1/1986 | Cooper ......................... | 323/248 |
| 4,659,941 A | * | 4/1987 | Quiros et al. .................. | 307/11 |
| 4,675,537 A | | 6/1987 | Mione .......................... | 307/38 |
| 4,704,722 A | * | 11/1987 | Henry .......................... | 375/376 |
| 4,706,182 A | * | 11/1987 | Masuda ........................ | 363/139 |
| 4,731,549 A | * | 3/1988 | Hiddleson ..................... | 307/125 |
| 5,006,780 A | * | 4/1991 | Tamura et al. ................. | 320/128 |
| 5,359,540 A | | 10/1994 | Ortiz ........................... | 364/528.3 |
| 5,465,366 A | | 11/1995 | Heineman ..................... | 713/324 |
| 5,477,476 A | | 12/1995 | Schanin ........................ | 713/324 |
| 5,483,464 A | | 1/1996 | Song ............................ | 713/302 |
| 5,581,453 A | * | 12/1996 | Ueta et al. ..................... | 363/49 |
| 5,594,672 A | | 1/1997 | Hicks ........................... | 713/321 |
| 5,603,040 A | | 2/1997 | Frager .......................... | 713/323 |
| 5,799,281 A | * | 8/1998 | Login et al. ................... | 705/1 |
| 5,821,924 A | | 10/1998 | Kikinis ......................... | 345/212 |
| 5,992,218 A | * | 11/1999 | Tryba et al. ................... | 73/40.5 R |
| 6,003,536 A | | 12/1999 | Polverari ...................... | 137/15 |
| 6,125,870 A | * | 10/2000 | Furmanek ...................... | 137/2 |
| 6,396,166 B1 | * | 5/2002 | Kim ............................. | 307/38 |
| 6,407,734 B1 | * | 6/2002 | Komine et al. ................ | 345/212 |
| 6,528,902 B1 | * | 3/2003 | Barton .......................... | 307/39 |

FOREIGN PATENT DOCUMENTS

JP      409213493 A * 8/1997 ............. H05F/3/04

* cited by examiner

Primary Examiner—Dennis M. Butler
Assistant Examiner—Nitin C Patel
(74) Attorney, Agent, or Firm—Stephen D. Carver

(57) ABSTRACT

Analog and digital power control switching circuits and power strips for use with various electronic devices and electrically operated appliances all enable a first device to control the powering or start-up of other devices. A smart power strip variation enables a user to energize all computer peripherals simply by turning the computer on or off. All embodiments comprise a sensing subcircuit that monitors AC current passed through the device or appliance plugged into a sensing outlet, which, in turn, generates a conditioned DC monitoring signal. A related control subcircuit driven by the monitoring signal powers suitable relays or transistors for activating downstream devices or appliances. All sensing subcircuits comprise a transformer primary, a capacitor, and at least one pair of anti-parallel diodes all connected in parallel. The stepped-up transformer output is rectified and filtered, yielding a DC monitoring signal delivered to the control subcircuit. Each control subcircuit has a solid state switch responsive to the monitoring signal that controls relays or transistors that power the controlled appliance or device. Preferred digital control subcircuits comprise a microcontroller that executes suitable software for dynamically determining the precise points at which the relays controlling downstream components should be activated or deactivated. In one digital variation, the user inputs suitable set points with manual switches that program the microcontroller. In a preferred digital version, a self-learning program is implemented by the control subcircuit to automatically determine future operating parameters.

6 Claims, 10 Drawing Sheets

POWER CONTROL CIRCUITS WITH ENHANCED NONLINEAR CURRENT SENSING

BACKGROUND OF THE INVENTION

I. Field of the Invention

The present invention relates generally to power switching devices for controlling electrical and/or electronic appliances, accessories and equipment. More particularly, our invention relates to power switching systems that monitor step changes in the current drawn by at least one of a plurality of devices connected to the system, and, in response, cause other devices connected to the system to be switched on or off. Representative prior art is seen in U.S. Patent class 713, Subclasses 300–324.

II. Description of the Prior Art

Current sensing devices are known in the art for controlling the power supplied by one or more secondary electrical outlets, in response to current changes sensed at a primary outlet that supplies power to a controlling device. For example, power strips are commonly employed for powering electronic appliances, including computer systems, high fidelity and stereo equipment, home theatre installations and the like. Typical power strips are equipped with multiple electrical outlets, and they are designed to be plugged directly into a U.S. standard 120 volt or foreign 240 volt wall outlet that provide power. They are equipped with a plurality of separate, electrical power outlets that provide power to numerous individual electronic components.

In high quality power strips, the output voltage may be conditioned and smoothed by the circuitry. Power spikes and voltage transients and the like are removed by appropriate circuits, including filter networks and the like. Higher quality power strips condition the A/C power distributed to computers and peripherals through their various outlets, and they may electronically shape the output power waveform. Most power strips provide some protection from power surges and transients. A pilot light, usually amber or red in color, provides a visual indication when the strip is properly plugged into an acceptable A/C outlet. A master power switch and one or more switches for controlling individual outlets may be included. High quality power strips that protect equipment from power spikes and voltage transients are ideal for use with computer systems.

Most modern computer installations usually include one or more power strips to provide power to the various components. For example, the main computer unit (i.e., comprising the motherboard and ancillary boards within a suitable cabinet), a printer, and the video monitor are often supplied by a single power strip. Other computer peripherals, such as scanners, external modems, occasionally tape backup units, and the like are also plugged into the master power strip. Where numerous outlets are needed, one or more secondary power strips may be plugged into the master power strip, in master-slave relation.

Relatively recently, small computer systems have adopted several facets of so-called "green" technology. Newer PC's (i.e., "personal computer") systems, for example, can be instructed to enter a "power conservation mode" that "powers down" hard drives and the like after predetermined time intervals. PC systems of this type typically implement green technology through the operating system or BIOS software. Often the "green settings" offered by the system BIOS are selectable by the user simply by addressing the CMOS memory options prior to system booting. Green PC's can power up directly by using the ATX "power" switch, and they typically power down through software. When the various hard drives in large network file servers, for example, are powered down after periods of monitored inactivity, wear can be reduced, and potentially damaging heat can be reduced. Many modern video monitors include green adaptations that extend their useful lives and conserve power by powering down their cathode ray tubes and deflection circuitry after predetermined periods of inactivity. This powering down process is also an important power conservation and environmental consideration when multiplied by millions of PC's. It is also mandated by recent EPA regulations.

However, when a newer computer invokes the "green" power saving mode, many peripherals connected to the power strip are left running. Despite the fact that the system may shut down, the hard drive(s) and/or video, and other peripherals may be left "on," thereby generating heat and wasting power. This can occur even in the standby mode. In complex, multi-component computer systems involving expensive audio systems with sub woofers, large tape backups and other accessory items, fifty to one hundred watts of power can be wasted. It would be advantageous if the CPU would also deactivate computer peripherals when the green power cycle is triggered. Further, it would be even more desirable if green computers would thereafter turn on peripherals when CPU activity commences, without requiring the user to tediously manually switch each device on.

There are other disadvantages with power strips. Before using the main on-off switch on a typical power strip, a prudent user must first power down the computer by instructing the operating system to "shut down." Even after the somewhat time consuming shutdown routine is completed, the peripherals remain "on," consuming power. Conventional power strips must be manually switched to disable peripherals. But the power strips are often placed on the floor beneath the user's desk, well away from convenient reach. The main switch is often obscured, if not completely hidden, by a randomly entangled mass of jumbled power cords leading all over the room. What inevitably happens is that the (industrial, business or military) user simply cannot be bothered, and the peripherals are left on.

Conventional power strips are awkward to place properly when used with complex home stereo systems, or with home theater applications. A modern home theater system may comprise a large screen television, a stereo receiver, a VCR, a cable decoder and/or a satellite receiver, a DVD system, a high power audio amplifier unit, one or more cassette or CD players, and several speaker systems, including at least one high powered sub-woofer. When power strips are used for centralized switching, numerous power cords are exposed, and the sight may not be aesthetically pleasing. Further, audio-visual components cannot conveniently be powered up or powered down in unison. Smaller power strips are inadequate because they have too few outlets.

U.S. Pat. No. 4,675,537, issued Jun. 23, 1987, discloses a power strip comprising a primary outlet and a plurality of separate, slave outlets for computer peripherals. The slave outlets can be controlled by condition-responsive sensing. The circuit derives a sensing signal in response to current through one of the outlets. The sensing signal triggers cascaded op-amps that ultimately fire an SCR to energize a downstream relay that controls one or more desired peripherals.

U.S. Pat. No. 5,465,366 derives a power-switching signal by monitoring the video data lines connected to a computer monitor, instead of monitoring input power lines of a device. It can thus control several peripheral devices.

U.S. Pat. No. 5,594,672 shows a software-intensive means of controlling peripherals by monitoring the digital data path between them and the host computer connection.

U.S. Pat. No. 5,821,924 shows a system that derives information from the video data bus to generate peripheral power control signals.

U.S. Pat. No. 5,483,464 illustrates a system using a digital control signal derived from a "green" computer controlling peripherals.

Bus connections are also monitored in the power saving, peripheral control devices of U.S. Pat. Nos. 5,603,040, 5,477,476 and 5,359,540.

Some prior art power switching systems monitor the incoming A/C current drawn by a monitored device by observing the voltage drop across one or more current-sensing resistors. Such resistors are disposed in series with the incoming power connection, so all of the sampled A/C current that powers the sampled device passes through them. Since the power dissipated by such resistors increases as the square of the voltage developed across them, only small resistive values can be used in practical sensing circuits. As long as relatively high current flows through the resistors, useable voltage signals can be derived across them. When very small currents pass through current sensing resistors of low resistance, the voltage developed across them is very small. When it is necessary to sense these very small voltage signals across the resistors, relatively expensive and sophisticated sensing circuitry is required. Practical limits exist on the ranges of current that can be sensed. A major problem occurs when current drawn by the device or appliance being monitored is very small, i.e., in the order of milliamps or less. The very small signal that results approaches the noise floor. Devices employing current sensing resistors also suffer from a limited range, and cannot ordinarily provide a useful control signal over a relatively wide current range of three or more orders of magnitude (i.e., from milliamps to tens of amps). When switched "on," some monitored devices draw significant current, i.e., approximately three or four orders of magnitude greater than the current drawn when "off." Simply stated, if the currents to be measured are very small, for example in the range of a few milliamps, then sensing resistors of large resistive values are required to obtain a sufficient voltage differential (and sufficiently good signal to noise ratio) to represent those currents.

In many applications, the current passing through sensing resistors will increase dramatically when the sensed device assumes different modes of operation. For example, when a typical washing machine changes from a fill cycle, with only its internal solenoids and timer drawing current in the milliamp range, to a wash cycle where the motor is activated, power consumption rises dramatically. Current may rise several orders of magnitude, exceeding ten amps or more. For accurate control signals to be derived by the resistors sensing this current, stability over the entire current range is required. While the resistors must accurately sense lower currents, they must remain stable when subjected to "I-squared-R" losses (and the resultant heat) caused by heavy currents. Proper design becomes awkward and expensive. Ventilation and heat dissipation requirements for the sensing resistors complicates the design and aggravates cost.

SUMMARY OF THE INVENTION

Our power control switching circuits are ideal for use with various electronic devices and electrically operated appliances, power tools and the like. For example, embodiments of our circuitry can control computer installations with multiple peripherals, complex audio and home-theatre installations, or electrical appliances. Forms of our invention are ideal for preventing flooding with washing machines or dishwashers by carefully controlling external solenoid valves that supply water to the appliance through flexible hoses and thereby remove the standing water pressure source when the machine is not in use. Another application of our invention relates to dust vacuums, that should be turned on in response to the activation of power routers or table saws. All embodiments of our circuitry employ a sensing subcircuit that monitors power delivered to at least one sensing outlet. Power demands and current characteristics exhibited by the device plugged into the sensed outlet(s) are carefully monitored by the sensing subcircuit that outputs a conditioned DC monitoring signal.

A related control subcircuit driven by the monitoring signal powers suitable relays or semiconductor devices for activating apparatus that is to be switched by our circuitry. Both analog and digital control subcircuits are disclosed. A "power strip" version of our device provides a monitored outlet, to which a computer may be plugged in, and a controlled outlet to which a conventional power strip my be plugged for powering peripherals and accessory components. In this mode, for example, a computer is plugged into our sensed outlet, and a conventional power strip is plugged into our controlled outlet. All the peripherals connected to the strip will be turned on or off when the computer is powered up or powered down. Similarly, complex audio or home video installations controlled by conventional power strips can be activated concurrently by sensing a primary device (i.e., an amplifier, a VCR, or a stereo receiver) plugged into the sensed outlet.

The preferred sensing subcircuits comprise a current sensing network interposed between a source of A.C. power and a sensed electrical outlet, into which a machine or appliance to be monitored is plugged. Thus, all of the power line current delivered to that machine or appliance is passed through the sensing network. The preferred network comprises a transformer having a primary winding connected in parallel with a capacitor and one or more pairs of anti-parallel diodes. A single pair of anti-parallel diodes may be used, or multiple pairs of anti-parallel diodes in series may be employed. The combination of anti-parallel diodes and a transformer winding provide a unique, sensed nonlinear current-voltage transfer function that is further processed by a filter that rectifies and filters the stepped-up transformer output. This monitoring signal is delivered to the control subcircuit.

In each embodiment, the control subcircuit has a solid state switching means that is responsive to the monitoring signal. In the analog variations, the monitoring signal drives a suitable transistor that ultimately controls a relay, or a power transistor where the controlled device/s are operated at a DC potential as in the case of the flood control embodiment of our invention.

In the digital versions, the control subcircuit preferably comprises a microcontroller that executes suitable software steps for dynamically determining the precise points at which the relays or transistors controlling downstream components should be activated or deactivated. In one form of digital control subcircuit, the user may input suitable control points with manual switches that program the microcontroller. In an advanced version of digital control subcircuit, a self-learning program automatically determines future operating parameters in response to parameters determined during initial system setup and component actuation.

Therefore, a basic object of our invention is to provide a highly sensitive current monitoring device for controlling a variety of electrical or electronic loads.

Another basic object is to provide an electronic sensing circuit that can power a plurality of electronic devices, and which derives a signal from a selected one of the devices to control the power to the others.

Another broad object is to provide an extremely sensitive circuit for controlling electronic appliances or devices by sensing small, A/C current changes in a selected appliance or device connected to the circuit.

A still further object is to provide a current sensing device that is extremely sensitive to very small current changes, but which can easily handle much larger currents passing through the system.

Another basic object is to provide a non-linear current sensing network that avoids the limitations of current-sensing resistors.

Yet another object is to avoid the potentially hazardous interposition of sensing-components within the neutral power line. It is a feature of our sensing means that hazardous voltage from the power line is completely isolated from our signal processing circuitry with a transformer circuit that we insert in series with the hot side of the power line. No component, such as a resistor, that has the remotest possibility of going open should ever be inserted in the neutral power line. An open neutral is a death trap. Further, with a sensing component and its subcircuits inserted in the neutral line there exists the remote possibility that the neutral and hot lines could, at some point, be interchanged with again, potentially catastrophic results.

A more specific object of our invention is to provide a flood prevention circuit that monitors dish washers, washing machines or similar appliances, and which disables the water supply lines when appropriate to prevent flooding.

A related object is to provide a current-sensing circuit of the character described that prevents water from flooding or overflowing when a critical hose supplying water to an appliance ruptures when the appliance is not in use.

Yet another specific object of our invention is to provide a highly sensitive, current-sensing circuit of the character described that monitors current changes in monitored devices and derives a corrective control signal therefore.

A still further object is to consistently present the voltage that must be derived for proper low level current sensing. It is a feature of our invention that conventional current sensing resistors are replaced with a network comprising one or more pairs of anti-parallel diodes that shunt the primary of a sensing transformer.

A more basic object is to monitor "green" computers or equipment, and, in response, to control auxiliary peripherals.

A related object is to provide a controller of the character described that derives useful control voltages from small currents, but which functions ideally even with relatively large currents.

Another basic object is to provide both analog and digital circuits capable of carrying out the above objects.

Another specific object of our invention is to provide a device for controlling home theatre or stereo sound systems by sensing power line current changes in one of a plurality of devices such as a VCR, CD player, DVD player or similar device. It is a feature of our invention that small drops or increases in power line current drawn by a self-timed tape or CD player, for example, are sensed by the invention and used to control other auxiliary components of a high performance audio or video system.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
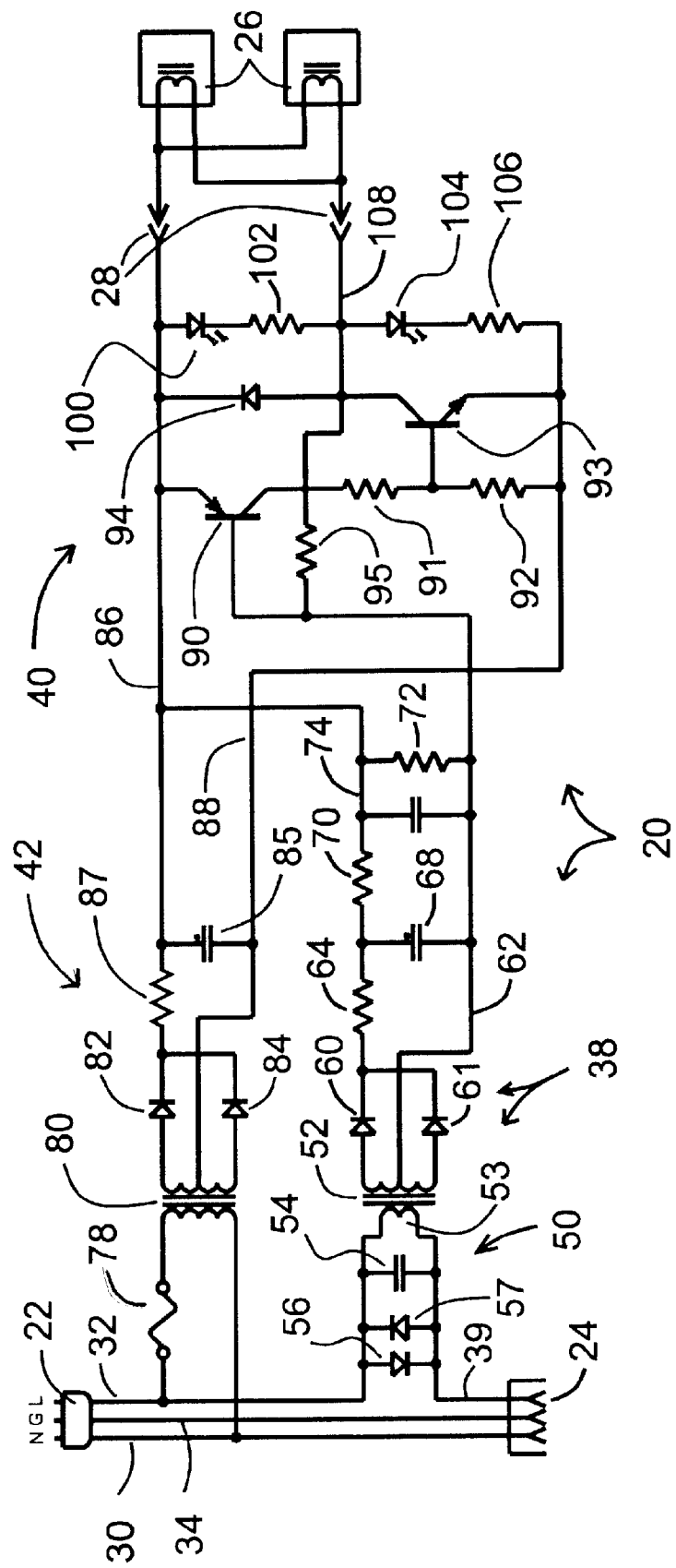
FIG. 1 is an electronic schematic diagram of a preferred analog switching circuit, adapted to control water flow to various appliances including washing machines, dishwashers and the like, FIG. 2 is an electronic schematic diagram of a dual analog power switching circuit useful for computer installations and the like, FIG. 3 is an electronic schematic diagram of a preferred digital power switching circuit constructed in accordance with the invention, adapted to control water flow to washing machines and the like FIG. 4 is an electronic schematic diagram of a dual digital power switching circuit.

With initial reference now directed to FIG. 1 of the appended drawings, the analog power control circuit constructed in accordance with the best mode of our invention has been generally designated by the reference numeral 20. While circuit 20 can control a variety of appliances or electronic devices, it is ideally adapted for controlling at least one water line associated with appliances such as dishwashers or washing machines.

Circuit 20 may be housed within a suitable cabinet (not shown) that mechanically mounts a conventional three-prong, grounded plug 22 inserted within a typical 120 or 240 V.A.C. wall outlet. Plug 22 provides a source of A.C. power. The washing machine (or other appliance to be controlled by circuit 20) is plugged into sensed outlet 24. The three prong electrical outlet 24 is mechanically secured to the circuit cabinet. Alternatively, circuit 20 may be housed within a suitable cabinet (not shown) from which extends a cable that intersects a conventional three-prong grounded plug and a conventional grounded current-sensed receptacle, both combined in a molded housing. The three-prong plug 22 is inserted within a typical 120 or 240 VAC wall outlet. The washing machine (or other appliance to be controlled by circuit 20) is plugged into the sensed outlet 24 that is incorporated into the housing.

With plug 22 energized, approximately 120 (or 240) volts appear across lines 30 and 32, with line 34 connected to ground. Lines 30 and 34 run directly to outlet 24 for connection to the load. However, line 32 reaches a sensing subcircuit 38 connected to outlet 24 via line 39. In other words, all current carried to the load connected to outlet 24 passes through subcircuit 38, which senses and then develops a monitoring signal in response. Control subcircuit 40 (FIG. 1) receives the monitoring signal from sensing subcircuit 38 and transforms it into a control voltage that ultimately actuates or disables solenoid valves 26. In the depicted embodiment these solenoid valves control the hot and cold water available to a conventional washing machine or dishwasher. Other appliances may be similarly controlled by connection to switched output jacks 28.

Depending upon current conditions through sensed outlet 24 monitored by the circuit 20, as described heretofore, conventional water control solenoid valve(s) 26 connected to jack 28 will be opened or closed as necessary to allow water to be passed to the flexible hoses supplying the dishwasher, washing machine or the like. Since valves 26 remain closed when the washing machine or dishwasher is not operating, flooding resulting from the availability of a continuous volume of water under pressure to the supply hoses, will be prevented.

Sensing subcircuit 38 (FIG. 1) comprises a non-linear, current sensing network 50 that is interposed between lines 32 and 39. Network 50 comprises a transformer 52 whose primary winding 53 is disposed in parallel with a non-polarized capacitor 54, and anti-parallel diodes 56 and 57. As used herein the term "anti-parallel diodes" means diodes connected in parallel that conduct in opposite directions. The nominally 2.2 mfd. capacitor 54 is used in the best mode for transient suppression and noise reduction. In very low current sensing applications, multiple series connected diodes may replace individual diodes 56 and 57.

Transformer 52, nominally comprising an impedance ratio of 8:1000, provides both isolation and voltage step-up. The signal output from transformer 52 is delivered for full wave rectification to diode rectifiers 60 and 61 that output through line 62 and resistor 64. Capacitor 68 in combination with resistor 64 functions as a D.C. filter network. The voltage divider comprising resistors 70 and 72 proportions the voltage from the sensing subcircuit 38. The monitoring signal developed by subcircuit 38 is delivered to control subcircuit 40 across lines 62 and 74. The monitoring signal is roughly proportional to the logarithm of the current sensed by subcircuit 38.

Control subcircuit 40 is energized by a power supply circuit 42 (FIG. 1) connected to line 32 via fuse 78. Circuit 42 comprises a power transformer 80, rectifier diodes 82 and 84, inrush limiting resistor 87 and filter capacitor 85. The output of this circuit, nominally 12 VDC, appears across lines 86 and 88. The monitoring signal across lines 62 and 74 is applied to the base of transistor 90, which is in a common emitter configuration, with resistors 91 and 92 and the base-emitter junction of transistor 93 comprising a load. Resistor 91 limits the current into the base of transistor 93, which is also in a common emitter configuration. When transistor 90 is caused to conduct by the signal from subcircuit 38, it in turn causes transistor 93 to conduct, which applies voltage from the power supply subcircuit 42 to the solenoids 26. When the monitoring signal exceeds approximately 0.6 volts, transistor 90 begins to conduct, applying current to the base of transistor 93, which then conducts, connecting line 88 to line 108, thereby energizing the water control solenoids 26. Resistor 95 provides positive feedback to eliminate the possibility of oscillations. In the best mode, a diode 94 extends between line 86 the collector of transistor 93 on line 108 to suppress the voltage spike created by the collapsing magnetic field of the water valve solenoids when transistor 93 is switched off. LED 100 powered by resistor 102 indicates when the first jack 26 is energized, and LED 104 powered by resistor 106 indicates powering of the second jack 26.

Figure 2:
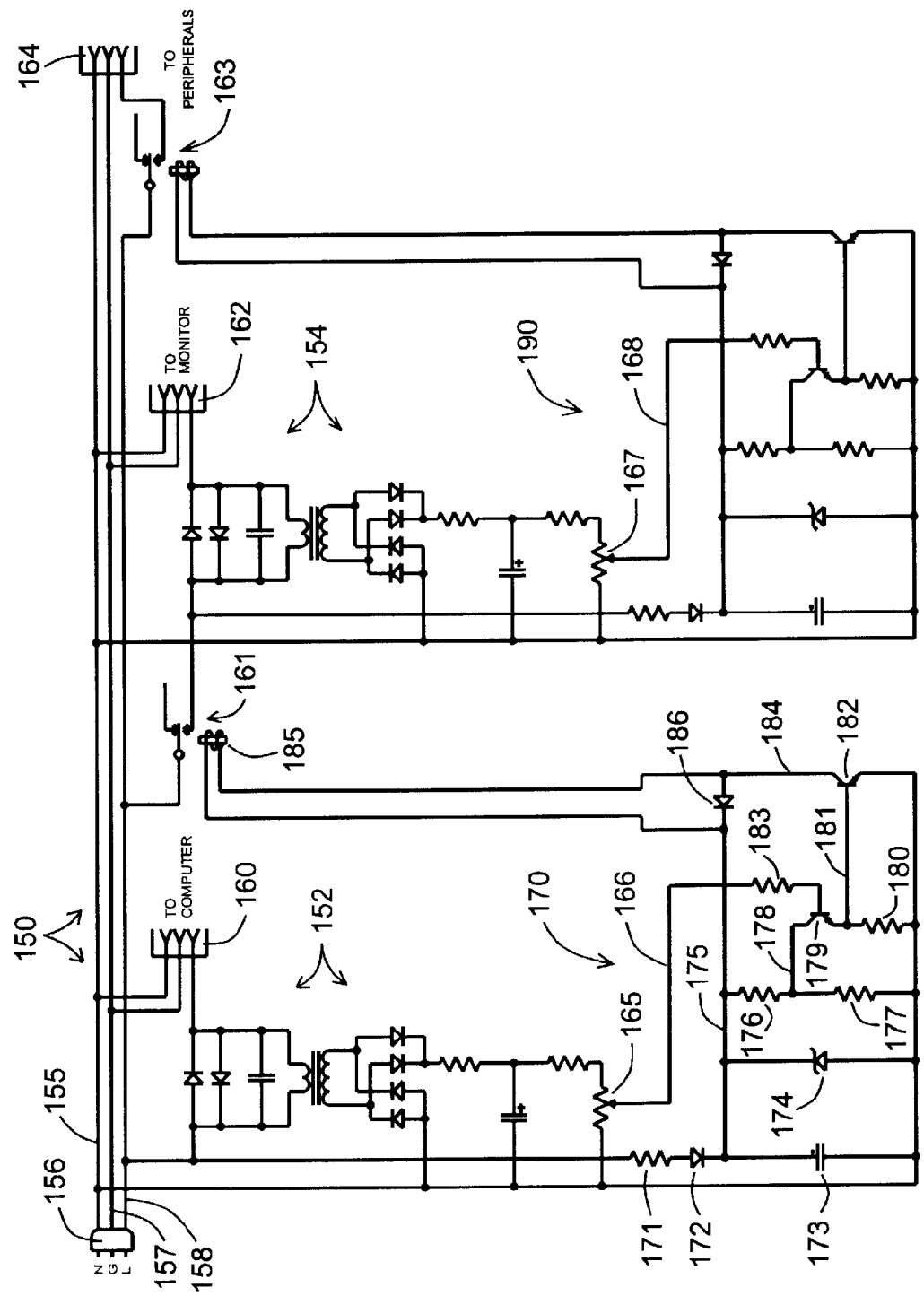

FIG. 2 discloses a dual analog power switch circuit 150 that comprises a pair of analog subcircuits 152 and 154 that function in tandem. These analog subcircuits 152 and 154 are quite similar to circuit 20 (FIG. 1) discussed in detail above, and they function similarly. Circuit 150 is energized by plug 156, whose lines 155 and 158 energize subcircuits 170 and 190. Ground line 157 extends directly to sensing outlet 160, outlet 162 and switched outlet 164. A first selected appliance plugged into sensed outlet 160 (i.e., a computer) is connected between power lines 155 and 158 through subcircuit 152. A first monitoring signal on line 166 is developed from user-adjustable potentiometer 165 and ultimately controls relay 161. The latter relay's contacts effectively connect outlet 162 across lines 155 and 158 with subcircuit 154 interposed therebetween. Thus, currents delivered to a first appliance or device connected to outlet 160 are sensed in order to turn on a second device or appliance plugged into outlet 162. Currents through the second appliance sensed by subcircuit 154 produce another monitoring signal derived from user-adjustable potentiometer 167 on line 168. Solenoid relay 163 can thereby be activated to control a third device or appliance plugged into outlet 164. In this embodiment, potentiometers 165 and 167 are used to set thresholds appropriate for the controlling devices being sensed. Outlet 162 (FIG. 2) thus functions both as a sensing outlet and a switched outlet.

Control subcircuit 170 (FIG. 2) is powered by line voltage through a circuit consisting of resistor 171, diode 172, and capacitor 173. Positive supply voltage on line 175 is regulated by zener diode 174 and applied across voltage-dividing resistors 176 and 177. The reduced voltage appearing on line 178 is applied to transistor 179 in an emitter follower configuration with resistor 180 as the load. The base of transistor 179 is controlled by potentiometer 165 via line 166 and resistor 183. The monitoring signal on line 181 is delivered to the base of transistor 182. When voltage on line 178 exceeds approximately 1.2 volts transistor 182 switches on, thereby energizing relay coil 185. Transistor 182 thus outputs the control signal that activates the relay 161 and in turn applies power to the controlled device. A diode 186 across lines 175 and 184 suppresses the back EMF from relay coil 185. Subcircuit 190 functions similarly.

Figure 3:
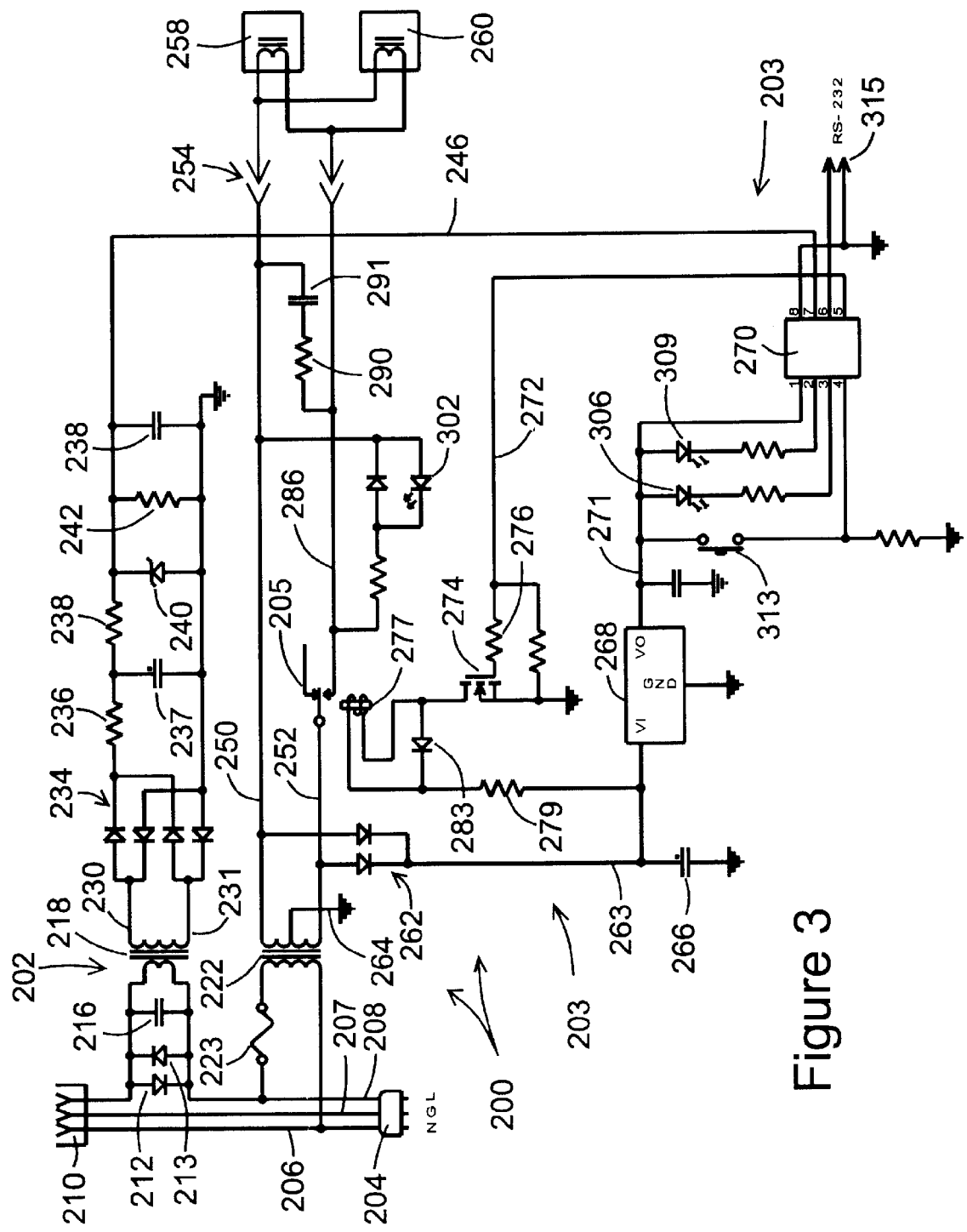

FIG. 3 reveals a digital power control circuit 200 that is one embodiment of our invention for use with washing machines, dishwashers and the like. Circuit 200 controls the water flow to the delivery hoses that lead to said appliances by monitoring current drawn by the appliance. When sensed conditions indicate an apparent water leak, flooding is avoided by shutting off the external solenoid valves that control water flow to the flexible hose/s supplying the appliance. The digital version, unlike the analog version, is able to detect a pause in the wash cycle, by looking for changes in current drawn by the appliance over time. By having previously profiled the current draw of the machine over time the circuit can detect an abnormally long delay in the wash cycle, possibly created by a hose blowout and, as a precautionary measure, it turns off the water supply through solenoid-activated valves.

Circuit 200 comprises a sensing subcircuit 202 that is similar to subcircuit 38 (FIG. 1) discussed earlier, and a digital control subcircuit 203. Subcircuit 202 derives a monitoring signal by analyzing current passing through the monitored appliance. Subcircuit 203 controls relay 205 in response to the signal supplied by subcircuit 202. Circuit 200 comprises a three-prong plug 204 inserted within a suitable AC outlet for power. AC source voltage appears across lines 206 and 208; line 207 is ground or neutral. Lines 206 and 207 run directly to a sensed outlet 210 into which a washing machine (or other appliance to be monitored) is plugged in. However line 208 connects to outlet 210 through sensing subcircuit 202, which effectively monitors current passed through the washing machine or other appliance.

Sensing subcircuit 202 comprises a pair of anti-parallel sensing diodes 212 and 213 that form a parallel network with capacitor 216 and transformer 218. All current passing through the load (i.e., that which is plugged into outlet 210) travels through the sensing subcircuit 202, and the anti-parallel diodes and transformer 218 produce a nonlinear current-voltage conversion. This voltage is multiplied and isolated by step-up transformer 218. The stepped-up output of transformer 218 appearing across lines 230, 231 is delivered to a full wave, diode bridge rectifier 234. Resistors 236 and 238 form a filtering network with capacitor 237. Zener diode 240 limits the voltage on line 246 to a maximum of 5.1 volts, and resistor 242 in conjunction with resistor 238 divides the signal and sets a decay time constant for capacitor 237. The monitoring control signal is delivered across capacitor 238 via line 246 to control subcircuit 203. The voltage on line 246 is roughly proportional to the log of the current traveling through the sensing network comprising diodes 212 and 213 and transformer 218.

Subcircuit 203 controls relay 205 (FIG. 3). A power supply transformer 222 is energized by lines 206, 208 via fuse 223. Transformer 222 outputs approximately 24 volts a.c. across lines 250, 252 that lead to switched outlets comprising jacks 254 for connection to water-control solenoid valves 258, 260. It will be appreciated that a variety of different devices could be attached to jacks 254 for control by circuit 200, so the device 200 is not limited to washing machines or dishwashers.

Figure 8:
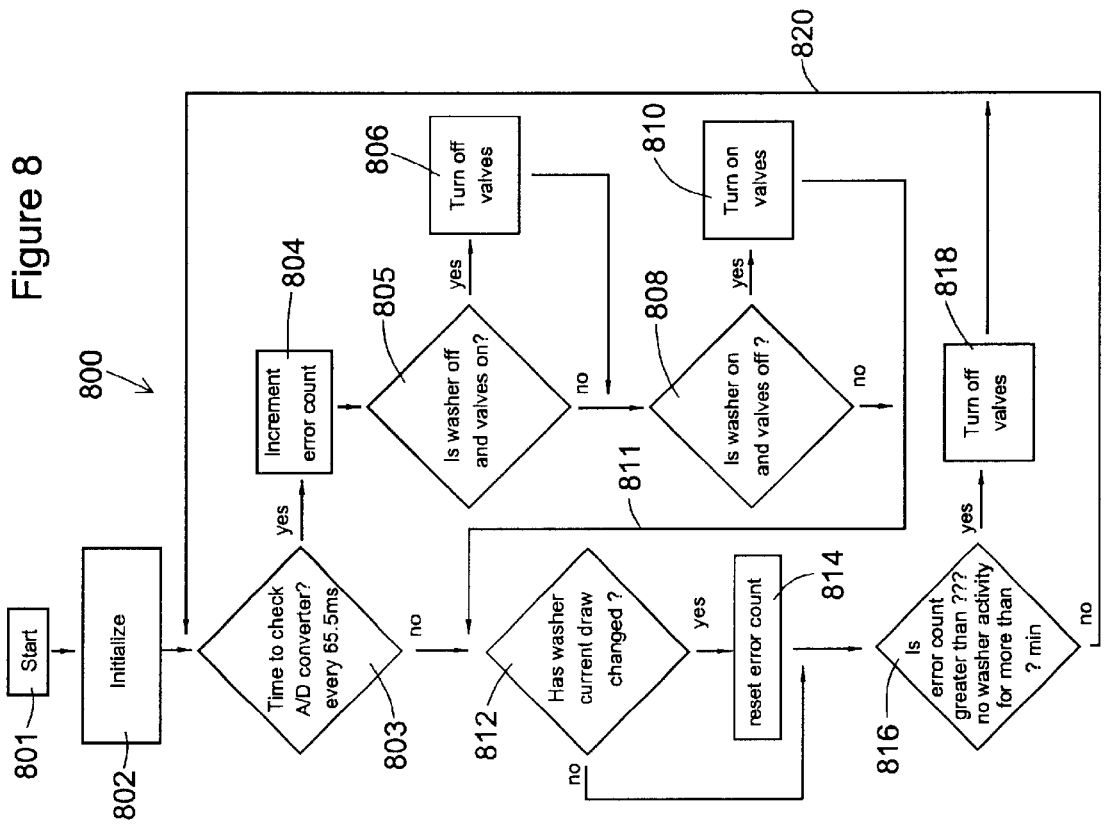
FIG. 8 is a software flow chart illustrating a typical microcontroller program for the digital embodiments of the invention.

The voltage across lines 250, 252 outputted by the primary of transformer 222 is applied to rectifier diodes 262, which output on line 263. The center tap of transformer 222 is connected to ground line 264. Positive voltage on line 263 is smoothed by capacitor 266 and delivered to voltage regulator 268 that powers microcontroller 270 via line 271. The microcontroller. 270 processes the monitoring signal appearing on line 246 at pin 7 through the software steps illustrated in FIG. 8 and discussed later. Line 272 on microcontroller pin 5 controls the gate of power MOSFET 274 through resistor 276. When activated, MOSFET 274 in effect grounds relay field 277, which is connected to unregulated DC voltage on line 263 via resistor 279. Diode 283 shunts the back EMF from relay coil 277. When relay coil 277 is energized, relay contacts 205 close, connecting lines 252 and 286 to energize water solenoid valves 258, 260.

Microcontroller 270 monitors the voltage on line 246 and compares it with a preset value. If the voltage is greater than the preset value, it is assumed that the washing machine has been turned on, so relay 205 is activated to energize the water control solenoids 258, 260, and water is delivered to the washing machine (or other appliance) as required. Resistor 290 and capacitor 291 form a snubber network that prolong the life of the relay contacts Preferably, there is an informational light system comprising a plurality of LED's. A yellow LED 302 lights when relay 205 is activated, to indicate that water has been turned on. The green LED 306 is connected to pin 3 of microcontroller 270 via a limiting resistor, to show that that the system is up and running, and is "on guard" and functioning. The red LED 309 connected to pin 2 of the microcontroller 270 through a current limiting resistor, is activated when a water leak or other improper condition is sensed. Switch 313 allows the user to reset the microcontroller. The RS-232 serial output on lines 315 facilitates diagnostics or connection to a home or business alarm or automation system.

Figure 4:
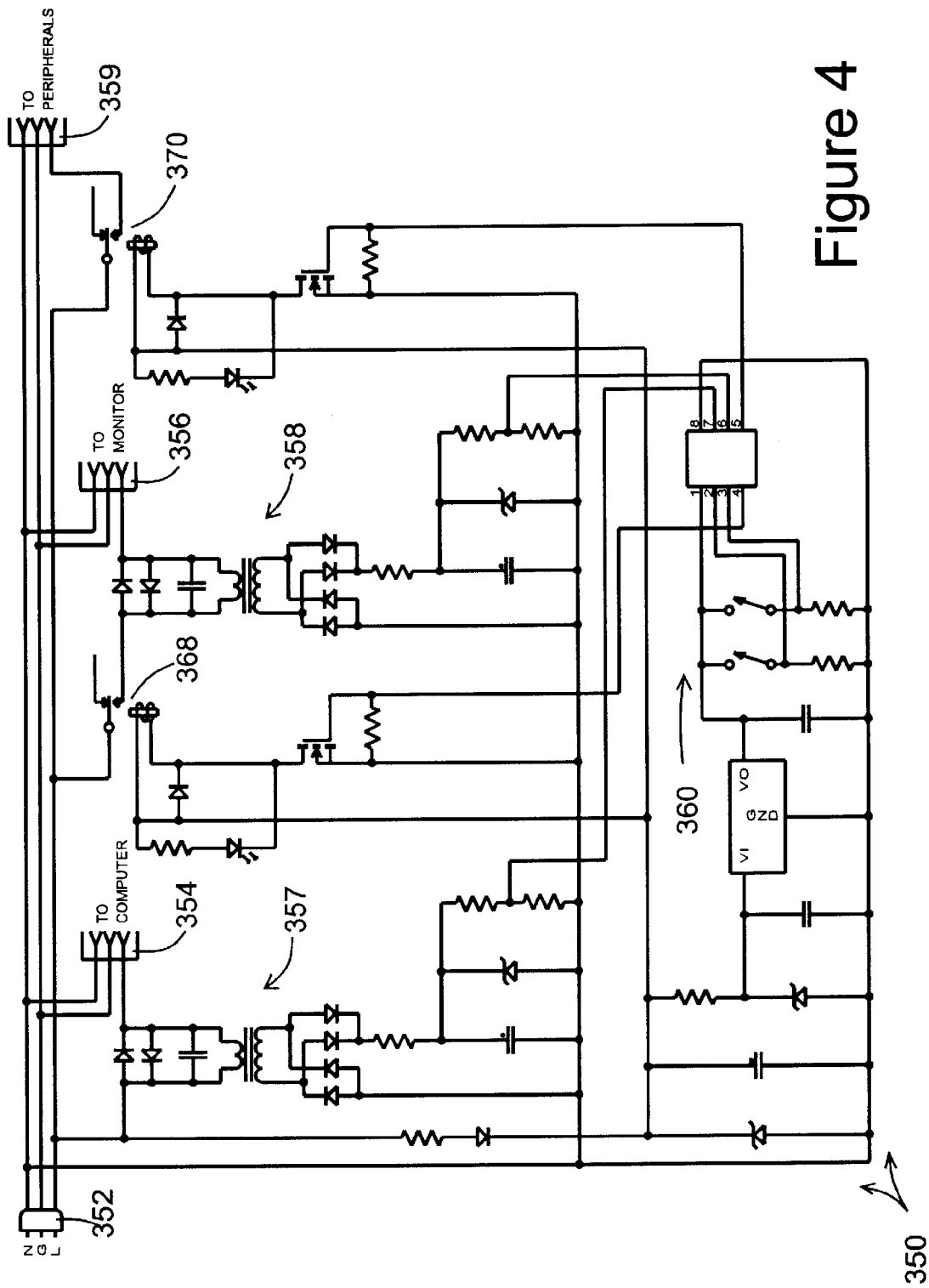

Turning to FIG. 4, the dual digital, power control circuit 350 thereshown hybridizes the concepts of the circuitry illustrated in FIGS. 2 and 3. Power is supplied by plug 352. A first device to be monitored (i.e., a computer) can be plugged into sensed outlet 354. A second device that is both controlled and monitored is plugged into sensed/monitoring outlet 356. A third device, or an intended electrical or electronic application can be controlled via switched outlet 359. Sensing subcircuits 357 and 358 are similar to sensing subcircuits 38, and 202 discussed in detail previously. They are monitored by control subcircuit 360 that functions similarly to subcircuit 203 (FIG. 3) discussed earlier. Microcontroller 364 controls a pair of relays 368 and 370.

The dual digital circuit 350 has a variety of applications. In computer systems it can be used to conserve power consumption by controlling power to peripheral devices in response to the cycling on or off of monitors or CPU's and to simplify powering up or shutting down of multiple components by using a single switching function. In high power audio installations, for example, it can make it easier for the user to control multiple complex, components. Further, it can be used in such systems to energize given components in a proper order to prevent speaker popping and to minimize dangerous power amplifier transients.

Figure 5:
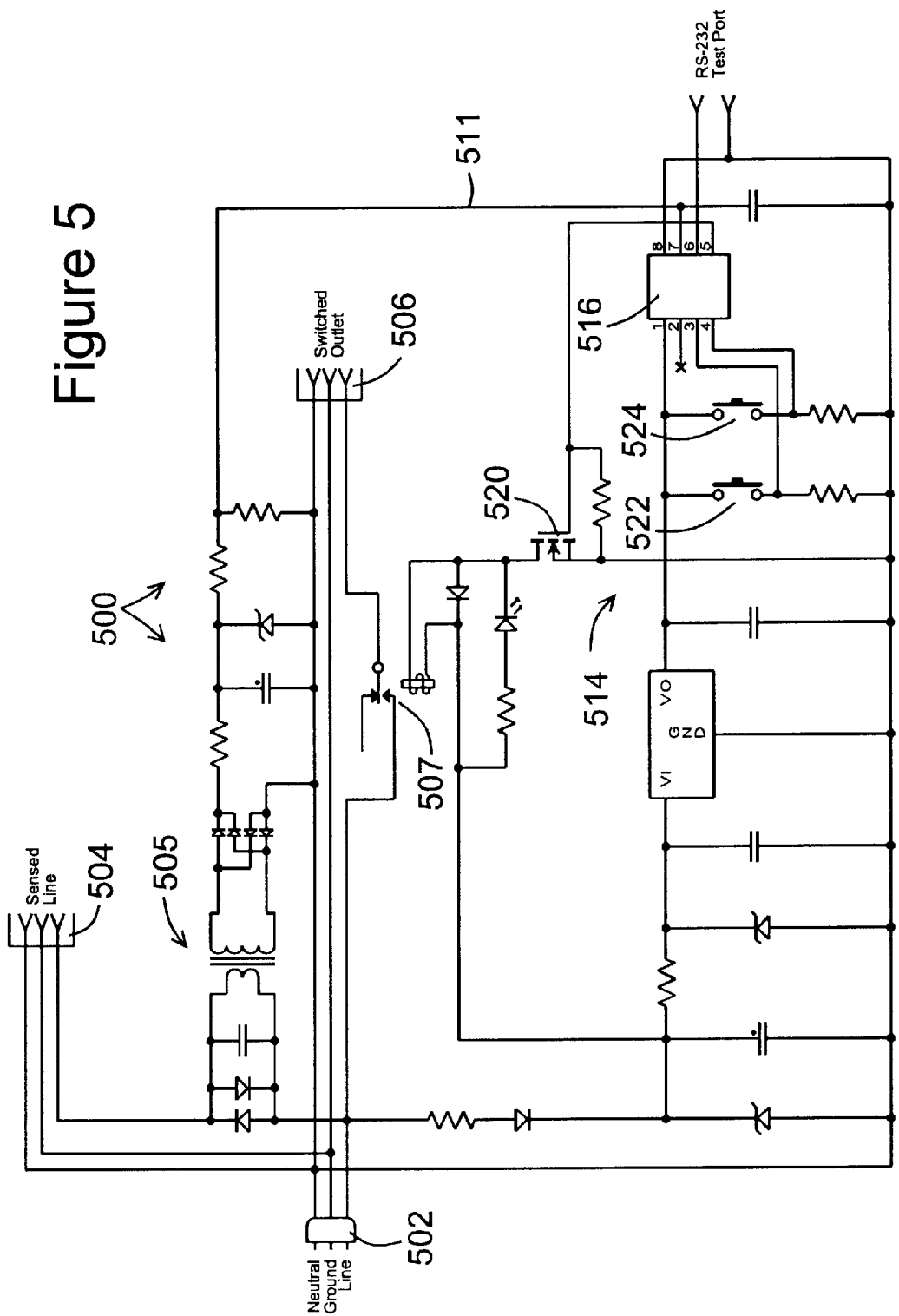
FIG. 5 is an electronic schematic diagram of an alternative digital power switching control circuit employing user-activated set switches.

The digital power switching circuit 500 (FIG. 5) is similar to circuit 200 of FIG. 3. However, it is adapted for use with computer equipment, rather than washing machines etc. Circuit 500 is powered by a three-prong plug 502. The device to be monitored (i.e., a computer) may be plugged into sensed outlet 504, which is monitored by sensing subcircuit 505 in the manner described earlier. The monitoring signal on line 511 is delivered to the control subcircuit 514, with line 511 connecting to pin 7 of microcontroller 516, which controls a MOSFET 520 in the manner previously explained. This activates relay 507 that controls switched outlet 506. Subcircuit 514 ideally comprises a pair of switches 522 and 524 that respectively connect pins 3 or 4 of microcontroller 516 to five volts. Typically, these switches are used by the user to set the points at which outlet 506 is switched on or off Ideally, circuit 500 (FIG. 5) monitors a computer plugged into outlet 504. The user's other computer appliances and accessories, such as printers, scanners, external modems, audio equipment, and the like can be left plugged into a conventional power strip, which is then plugged into switched outlet 506 (FIG. 5).

Figure 9:
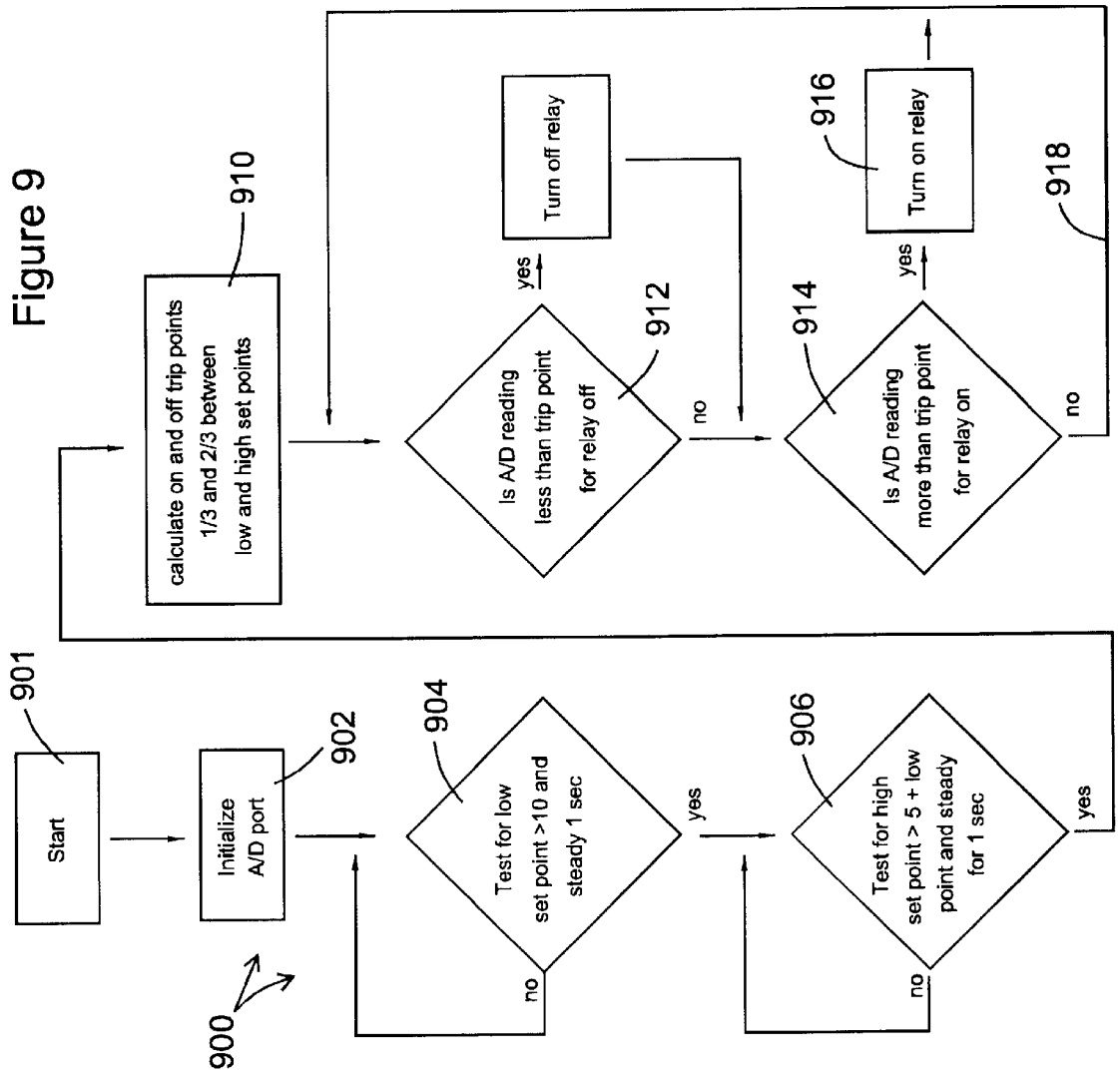
FIG. 9 is a software flow chart illustrating the self learning code employed, for example, by the circuit of FIG. 6; and, FIG. 10 is a software flow chart illustrating the preferred master-slave controller software when the circuit of FIG. 5 is used to control conventional power strips.

Power control circuit 600 (FIG. 6) is very similar to circuit 500 (FIG. 5) discussed above. However, the control subcircuit 614 lacks manual switches comparable to switches 522, 524 (FIG. 5). Instead, microcontroller 616 is further programmed with a "self learning" subroutine disclosed in FIG. 9 to be discussed later. Circuit 600 is ideal for eliminating user involvement in the set-up process.

Figure 7:
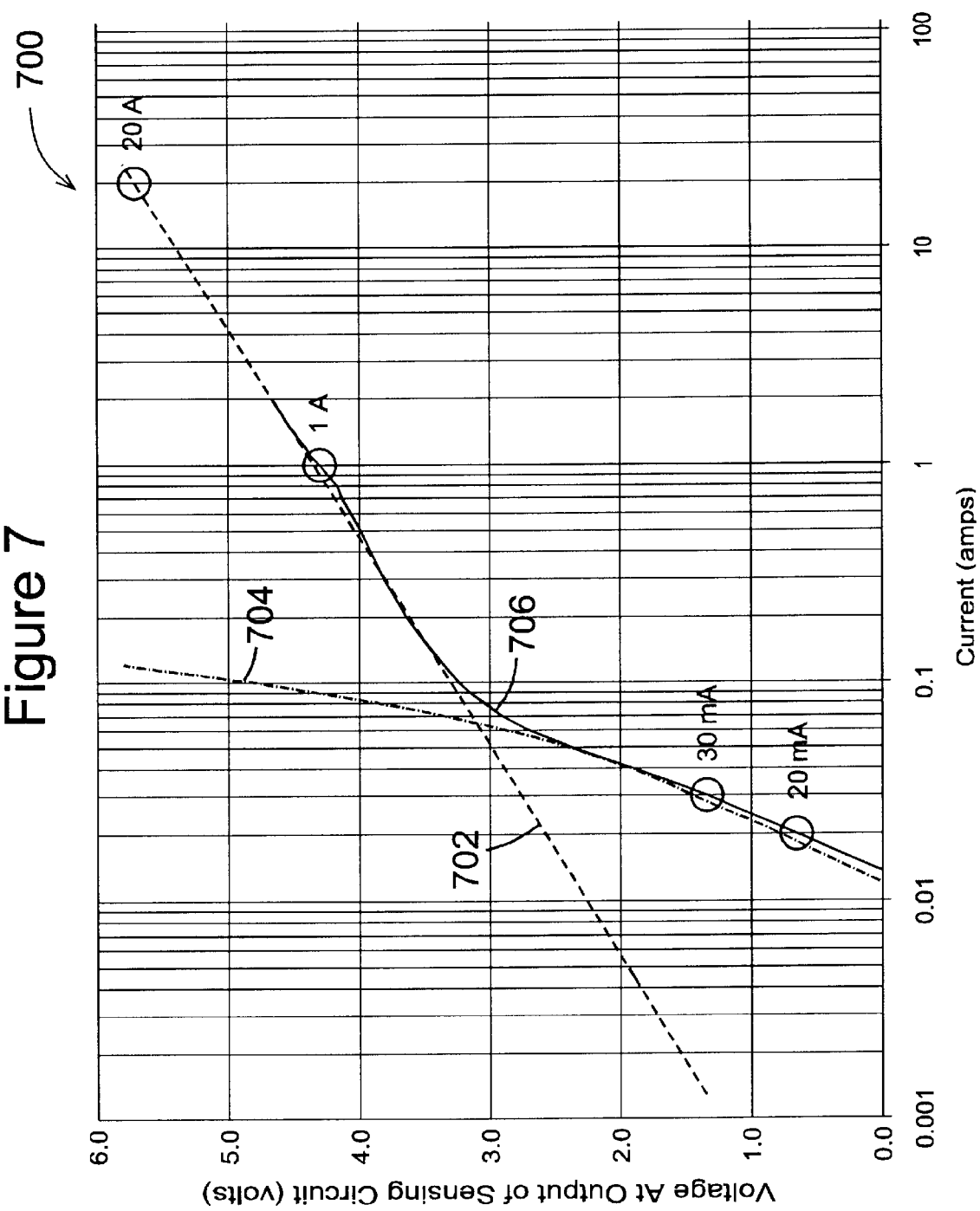
FIG. 7 is a graph plotting the relationship between sensed AC current presented as a voltage across the sensing transformer primary and rectified and filtered DC output voltage from the sensing transformer secondary, with the current scale plotted logarithmically.

With reference now to FIG. 7, graph 700 discloses the preferred AC current-voltage relationship produced by the anti-parallel diode and transformer arrangements employed by the preferred sensing subcircuits (i.e., subcircuits 38, 202 previously discussed). Trace 702 shows the curve exhibited by a circuit utilizing diodes alone. Trace 704 shows the curve exhibited by a circuit utilizing a transformer alone. The combined relationship is shown by trace 706. The desired curve is quite steep in the relatively low current range, so a useful voltage differential is obtainable against the noise that would otherwise desensitize the circuit. As current rises to order of 100 milliamps (i.e., towards the right of the graph) the slope decreases for current measurements over a more limited differential range.

The software program 800 (FIG. 8), or versions differing only in minor details, can be executed by the previously discussed microcontrollers in the various digital sensing circuits 200, 350, 500, 600 seen in FIGS. 3–6 discussed earlier. For purposes of illustration only, it is assumed that programs 800 will be specifically used with circuit 200 (FIG. 3) for controlling washing machines. In step 801 the system is started, followed by initialization of the relevant microcontroller in step 802. The microcontroller performs an analog-to-digital conversion of the monitoring signal supplied to it after a predetermined interval (i.e., nominally 65.5 ms.) when executing step 803. If the time interval has passed, the error count is incremented in step 804, and step 805 determines whether the washing machine is "off" and the water solenoid valves are "on." If so, the solenoid valves are deactivated in step 806. Step 808 determines if the washing machine is "on" with the solenoid valves "off." If so, step 810 activates the solenoid valves; if not, step 812 is invoked via line 811.

Step 812 determines if the washer current draw has changed. If so, the error count is reset in step 814; if not, step 816 analyzes the error count to determine the time span of washer inactivity. If the error count is sufficient, then there has been no washer activity for several minutes, and the valves are turned off in step 818, with a return step as indicated by line 820. If the error count is not sufficient, then there has been recent washer activity, and a return is executed, as shown by line 820.

The error count in step 816 (FIG. 8) must be greater than a predetermined user-selected amount before step 818 is initiated. The parameter test limits of step 816 (error count, washer inactivity) can be programmed into the microcontroller or can automatically be established with a self-learning program.

Figure 6:
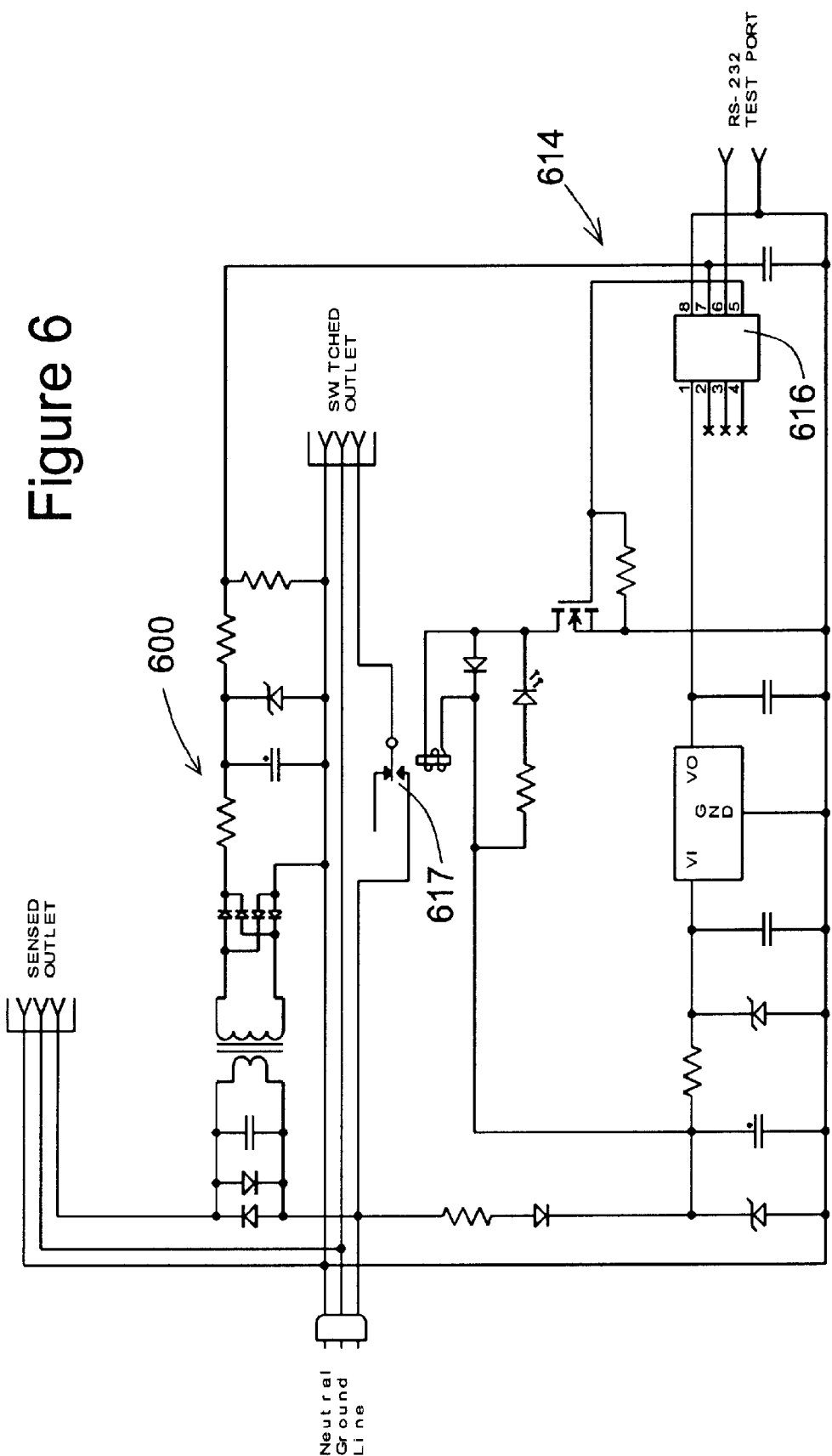
FIG. 6 is an electronic schematic diagram of an alternative digital power switching control circuit similar to that seen in FIG. 5, but employing self-learning software instead of user-activated set switches.

The self-learning program 900 (FIG. 9) is ideally run by circuit 600 (FIG. 6). Whether the given circuit is employed for controlling washing machines, computer installations, audio or home theatre systems, or other applications, it will be understood that the digital versions of the aforementioned controller circuits can all utilize the software if necessary.

Program 900 (FIG. 9) starts as indicated by block 901, and initializes in step 902. In step 904 the control code looks for a steady state voltage level that meets the requirements for the low level set point. At this time a device plugged into a sensed outlet must be "off." The A/D reading must be greater than a raw count of ten, out of a possible 255, and it must be steady for greater than one second. This value is stored as the low set point. Assuming step 904 is successful, step 906 occurs. The program waits for the device plugged into the sensed outlet to be turned on, indicated by an A/D count of at least five counts larger than the low set point. Step 906 repetitively reads the A/D converter until it is steady for more than one second. It then stores that value as the high set point. When both set points are established, step 910 calculates trip points. The trip point that turns on the relays (i.e., relay 617 of circuit 600 in FIG. 6) is ⅔ of the way between the low and the high set points, the point that turns off the relays is ⅓ of the way between the two set points. The ⅓ differential results in hysteresis for the purpose of eliminating any possibility of oscillations when the A/D converter value is near the trip point. Thereafter, if the A/D reading is less than the "off" trip point calculated in step 910, step 912 turns off the relay. Step 914 commences whether or not the relay was turned off. In step 914, if the A/D reading is greater than the "on" trip point established in step 910, the relays are activated in step 916. The program then returns to step 912, indicated by line 918, whether or not the relay was activated in step 916.

Figure 10:
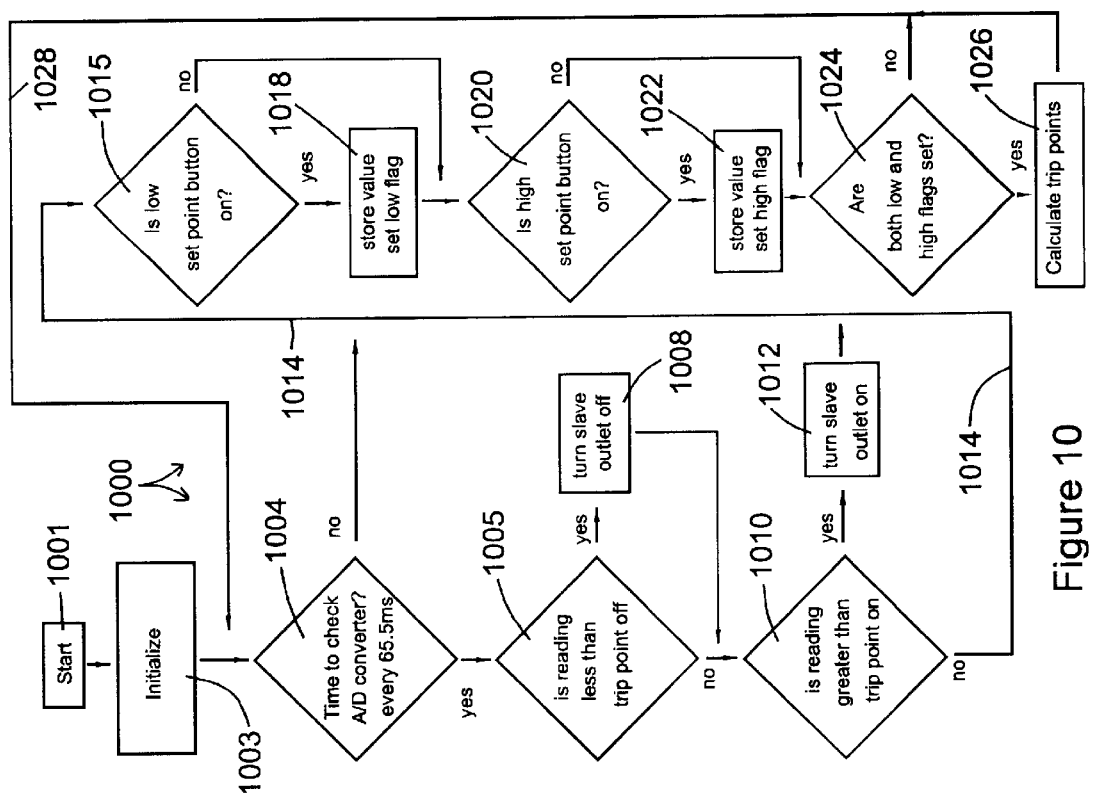

FIG. 10 discloses the software subroutine 1000 for controlling the digital circuitry 500 when the latter is employed in computer applications, for example, to control a power strip. Start is indicated at 1001, followed by initialization step 1003. The internal clock is checked in step 1004, to see if the next time increment (65.5 ms) has elapsed. If it has not, the program proceeds to step 1014. If 65.5 ms has elapsed, the program proceeds to step 1005 where the A/D converter (i.e., part of microcontroller 516) is checked and compared to the "off" trip point. If the A/D reading is less than the "off" trip point, the switched outlet (i.e., outlet 506 in FIG. 5)is turned off in step 1008. If not, step 1010 determines if the reading is greater than the trip point. If so, the switched outlet is activated in step 1012; if not, line 1014 directly commences step 1015.

The low set point button or switch 522 (FIG. 5), which should be user activated when the monitored device is "off" to custom program subroutine 1000 (FIG. 10), is monitored in step 1015. If the switch is on, a "set low flag" step 1018 adds the sensed "lowest current" reading to memory. Similarly, step 1020 (FIG. 10) looks for switch 524 (FIG. 5). If this "high set button" is "on," the high current value sensed when the device plugged into sensed outlet 504 is "on," will be stored in step 1022. Step 1024 checks to see if both low and high flags have been set. If they have, then trip points will be determined in step 1026, and a return executes as indicated by line 1028, in a manner similar to that discussed in conjunction with FIG. 9.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An electronic switch for monitoring a first electrical or electronic appliance or device to control other electronic appliances, devices, accessories or equipment, the switch comprising:

incoming power lines for connecting the switch to an external source of A. C. electrical power;

a sensed power outlet to which said first electrical or electronic device is plugged in;

a non-linear, current-sensing subcircuit interconnected between said incoming powering lines and said sensed outlet for monitoring step changes in the current drawn by said first electrical or electronic device and outputting a monitoring signal, said current sensing subcircuit comprising:

a step-up transformer having a primary winding and a secondary winding, the primary winding connected in series between said sensed power outlet and one of said incoming power lines;

a pair of power diodes for carrying large amounts of current shunted across said primary winding in anti-parallel relation for delivering a non-linear voltage to said step-up transformer primary in response to current traveling through them that is delivered to said sensed power outlet;

a capacitor connected in parallel with said diodes; and, a filtering and rectifying circuit connected to said step-up transformer secondary winding for generating said monitoring signal;

at least one controlled outlet to which said other electronic appliances, devices, accessories or equipment are plugged in; and, a control subcircuit responsive to said monitoring signal for turning said at least one controlled outlet off and on, said control subcircuit comprising solid state switching means responsive to the monitoring signal, and a microcontroller that executes suitable software steps for dynamically determining the precise points at which the control subcircuit should be activated or deactivated.

2. The switch as defined in claim 1 further comprising user-activated manual switches for establishing suitable control points to program the microcontroller.

3. The switch as defined in claim 1 further comprising self-learning means for automatically determining future control points in response to parameters determined during initial system setup and component actuation.

4. The switch as defined in claim 1 wherein:

said first electrical or electronic device is a personal computer; and, said other electronic appliances, devices, accessories or equipment are selected from the group consisting of computer monitors, printers, scanners, computer audio and sound accessories, and modems.

5. The switch as defined in claim 1 wherein:

said first electrical or electronic device is selected from the group consisting of home theater amplifiers, stereo receivers, audio power amplifiers; and, said other electronic appliances, devices, accessories or equipment are selected from the group consisting of computer audio sub-woofers, CD players, DVD players, and television receivers.

6. The switch as defined in claim 1 wherein:

said first electrical or electronic device is an appliance or device to which water is directed such as a washing machine, water heater, dish washer; and, said other electronic appliances, devices, accessories or equipment is a water control solenoid valve.

\* \* \* \* \*